United States Patent
Tamura et al.

(10) Patent No.: US 6,819,019 B2
(45) Date of Patent: Nov. 16, 2004

(54) MOTOR EQUIPPED WITH ROTATION SENSOR

(75) Inventors: Masayuki Tamura, Ohta (JP); Isao Abe, Ashikaga (JP); Yuji Hagiwara, Kiryu (JP)

(73) Assignee: Mitsuba Corporation, Kiryu (JP)

( * ) Notice: Subject to any disclaimer, the term of this patent is extended or adjusted under 35 U.S.C. 154(b) by 0 days.

(21) Appl. No.: 10/031,392

(22) PCT Filed: Feb. 8, 2001

(86) PCT No.: PCT/JP01/00899

§ 371 (c)(1),
(2), (4) Date: Feb. 4, 2002

(87) PCT Pub. No.: WO01/89064

PCT Pub. Date: Nov. 22, 2001

(65) Prior Publication Data

US 2003/0164652 A1 Sep. 4, 2003

(30) Foreign Application Priority Data

May 19, 2000 (JP) ...................... 2000-148912

(51) Int. Cl.[7] .............................................. H02K 11/00
(52) U.S. Cl. .......................... 310/71; 310/68 B; 310/42
(58) Field of Search ................................ 310/68 B, 71, 310/89, 67 R (56) References Cited

U.S. PATENT DOCUMENTS

| | | | | |
|---|---|---|---|---|
| 4,982,125 A | * | 1/1991 | Shirakawa | 310/88 |
| 5,086,243 A | * | 2/1992 | Hofmann | 310/68 B |
| 5,453,649 A | * | 9/1995 | Blanchet | 310/71 |
| 5,532,533 A | * | 7/1996 | Mizutani | 310/68 B |
| 6,091,171 A | * | 7/2000 | Ohishi et al. | 310/68 B |
| 6,107,713 A | * | 8/2000 | Hulsmann et al. | 310/75 R |
| 6,127,752 A | * | 10/2000 | Wiesler | 310/68 B |
| 6,166,468 A | | 12/2000 | Suzuki et al. | 310/90 |
| 6,201,326 B1 | * | 3/2001 | Klappenbach et al. | 310/75 R |
| 6,225,715 B1 | * | 5/2001 | Hoda et al. | 310/67 R |
| 6,249,068 B1 | * | 6/2001 | Knopp | 310/71 |
| 6,268,669 B1 | * | 7/2001 | Wakao et al. | 310/67 R |

FOREIGN PATENT DOCUMENTS

| | | |
|---|---|---|
| JP | U 64-50647 | 3/1989 |
| JP | U 1-147672 | 10/1989 |
| JP | A 9-226527 | 9/1997 |
| JP | A 11-215773 | 8/1999 |
| JP | A 11-215774 | 8/1999 |
| JP | A 2000-121385 | 4/2000 |

* cited by examiner

Primary Examiner—Dang Le
(74) Attorney, Agent, or Firm—Oliff & Berridge, PLC (57) ABSTRACT

A rotation detecting device which detects the rotational state of a rotary shaft, is structured to be a device in which the number of parts is small, and the incorporation is simple. The structure is such that a long holder receiving part is formed on the channel back side in an opening part of a motor shaft case body of a casing which contains a reduction mechanism part, and a sensor holder in which a hall device, the rotation detecting device, is incorporated, is slid in the longitudinal direction of the motor shaft, and is incorporated in the holder receiving part in the lightly pressed state, similarly to the incorporation of the motor shaft.

20 Claims, 10 Drawing Sheets

MOTOR EQUIPPED WITH ROTATION SENSOR

BACKGROUND OF THE INVENTION

1. Field of Invention

The invention relates to the technical field of a motor with a rotation detecting device, which is used for electrical equipment mounted on a vehicle or the like.

2. Description of Related Art

Figure 10A:
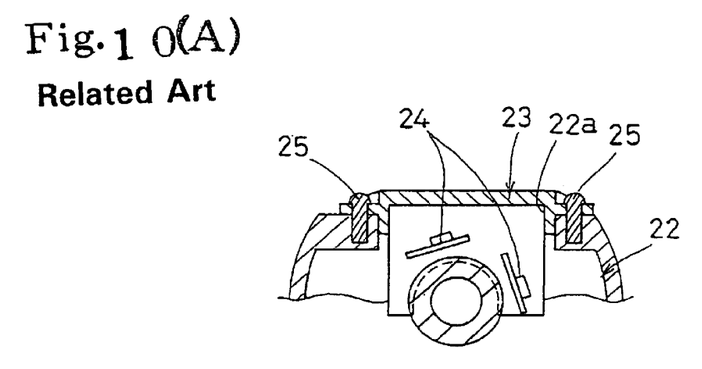
FIGS. 10(A) and 10(B) are a side cross sectional view and a partial front view explaining the rotation detecting device in a conventional motor, respectively.

Generally, in this type of motor, there is a rotation detecting device which detects the rotational amount of a rotary shaft of the motor for detecting the movement amount or the position of a movable member (actuator) acting on the basis of the driving of the motor. As such a motor, motors which are shown in JP-A-11-215773 and JP-A-11-215774 are proposed. In the case of these motors, as shown in FIG. 10(A), an opening 22a is formed in the peripheral surface of the cylindrical part of a casing 22 where a reduction worm wheel and a rotary shaft worm forming part of the motor are contained. The structure is such that a rotation detecting device 24 is provided on the inside surface of a sensing unit 23 which is formed to close the above described opening 22a, and waterproofing of the rotation detecting device 24 or other members which are arranged in the interior of the casing 22 is achieved by putting a seal member between the peripheral part of the casing opening 22a and the sensing unit 23 to close the opening 22a.

However, with such a structure as the above described conventional one, the sensing unit 23 in which the rotation detecting device 24 is provided is inserted from the outside of the opening 22a, formed in the peripheral part of the casing 22, and is integrated by fixing means, such as, using screws 25. Therefore, not only the screwing work becomes necessary making the work troublesome but also incurs a risk that the screw 25 is loosened by an external force as the fixing screw 25 is exposed to the outside of the motor. Additionally, the problem that the above described water proof structure must be provided at the boundary part between the casing 22 and the sensing unit 23 is created.

Figure 10B:
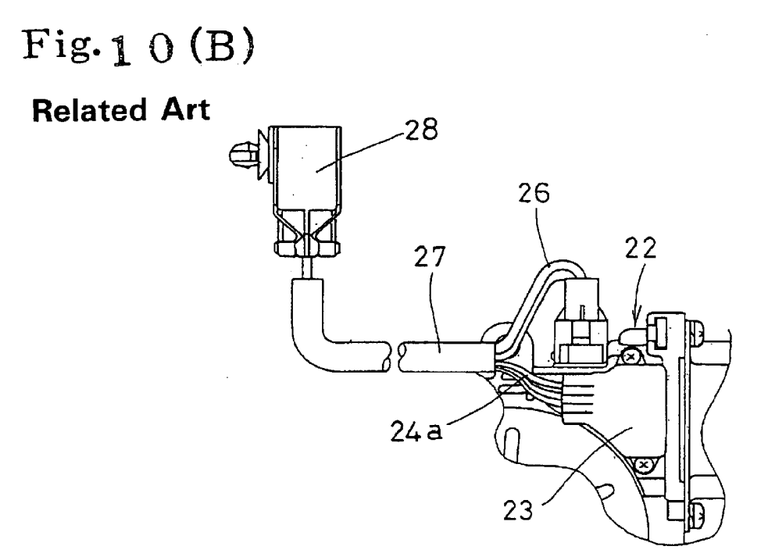

On the other hand, when providing a rotation detecting device, the electrical connection for feeding electricity to the rotation detecting device is necessary. In the case of the conventional one, as shown in FIG. 10 (B), a lead wire 24a is pulled out of the rotation detecting device 24 and is integrated with a lead wire 26 which is separately pulled out for feeding a brush to form an extension harness 27. At the end part of the extension harness 27, a connecting male coupler 28 is provided, and to the male coupler 28, a female coupler which is pulled out from the external power source on the vehicle body side or the like is connected. However, each extension harness 27 is required to have a different length depending on the position where the motor is provided. Therefore, it is necessary to prepare motors in which extension harnesses 27 of various kinds of specifications are provided. Additionally, there are such problems that the number of products becomes large making quality control troublesome, and causing a high cost.

Furthermore, in the case where such a motor is attached to the door of a vehicle or the like, horizontally mirror image casings 22 may be prepared, but the shape of the opening 22a formed in each casing 22 is not horizontally symmetrical. Therefore, there is a problem that a sensing unit 23 with a shape corresponding to each of these openings 22a must be prepared, which makes it difficult to use a common part. The problems to be solved by the invention exist in these points.

SUMMARY OF THE INVENTION

The invention is created in view of the situation, having an object of solving the problems discussed above, and it is a motor comprising a rotary shaft; a casing with a bottomed cylindrical part which rotatably contains the rotary shaft; and a rotation detecting device which detects the rotation of the rotary shaft, wherein the rotation detecting device is supported by a sensor holder, and the sensor holder is disposed in the casing by the incorporation(installation) from the incorporating direction to the cylindrical part of the rotary shaft. By doing so, the sensor holder is arranged to be housed in the casing, and it becomes unnecessary to provide a waterproof structure.

In this motor, it is possible that a holder receiving part is formed on the inner peripheral surface of the cylindrical part of the casing of the invention, and that a sensor holder is incorporated in the holder receiving part in a state of temporary holding, and a fixing means for the sensor holder, such as screws, becomes unnecessary.

Furthermore, in the motor, the sensor holder of the invention can be a holder, where a sensor support part in which the rotation detecting device is incorporated and a terminal support part in which a connecting terminal thereof is incorporated are formed, and a connecting opening part for seeing the terminal support part from the outside is formed in the outer peripheral surface of the cylindrical part of the casing.

Furthermore, in the motor, it is possible that, on the opening side of the cylindrical part of the casing of the invention, a brush unit in which a brush is incorporated is fixed, and that the sensor holder in the casing is positioned and supported by the casing on the basis of the fixing to the casing of the brush unit.

Furthermore, in the motor, the structure can be such that the brush connecting terminal incorporated in the brush unit of the invention extends onto the terminal support part of the sensor holder so as to be supported by the terminal support part, and to be seen from the connecting opening part of the casing.

Furthermore, in the motor, the connecting opening part of the casing of the invention can be a part where at least one projecting piece part which projects toward the outside diameter side is formed.

Furthermore, in the motor, an external pull-out terminal unit which is electrically connected to each of the connecting terminals of the rotation detecting device and the brush can be incorporated, in the connecting opening part of the invention, from the outside diameter side of the cylindrical part.

Furthermore, in the motor, the structure can be such that the terminal of the terminal support part of the invention is supported in the state of projecting in the outside diameter direction of the cylindrical part and, on the other hand, a support piece part, which supports the terminal support part of the sensor holder, is formed on the holder receiving part on the bottom side of the cylindrical part, and the incorporation load at the time of incorporating the external pull-out terminal unit to the terminal support part is received by the support piece part through the terminal support part. Thus, the incorporation load acting on the sensor holder to deform the sensor holder is avoided, and the accuracy of the rotation detection can be raised.

Furthermore, in the motor, the structure can be made such that to the external pull-out terminal unit of the invention, at least one engaging claw is formed on the incorporation tip side, and the engaging claw is engaged with the step-like engagement receiving part which is formed to the connecting opening part, when the external pull-out terminal unit is incorporated in the connecting opening part. By doing this, it becomes possible to set an engagement receiving part with which the engaging claw is engaged, without providing an opening which leads to the periphery of the projecting piece part, and the external pull-out terminal unit can be attached to the connecting opening part in a sealing state so that a water proof structure is provided, and the workability can be improved.

Furthermore, in this motor, the engagement receiving part of the invention is formed integrally when the cylindrical part is molded.

BRIEF DESCRIPTION OF THE DRAWINGS

The invention will be described with reference to the drawings, in which.

DETAILED DESCRIPTION OF PREFERRED EMBODIMENTS

The embodiment of the invention will be described on the basis of the drawings of FIG. 1 to FIG. 9(B).

In the drawings, reference numeral 1 denotes a motor (motor device) with a reduction mechanism and a rotation detecting mechanism. One end part of a motor shaft (rotary shaft) 4 is rotatably supported by a bearing unit including a thus bearing 4f pressed into the motor shaft 4 and a radial metal bearing 4g pressed into a motor yoke 3, shaped like a cylinder, with a bottom which composes a motor part 2 of the motor 1. An armature core 4a is positioned at one end side of the motor part 2 and rotates integrally with the motor shaft 4 and a commutator 5 is positioned at the other end side of the motor part 2 and rotates integrally with the motor shaft 4. Both are attached to the motor shaft 4 in the motor yoke 3. Reference numeral 3a denotes a pair of permanent magnets which are fixed to the inside peripheral surface of the motor yoke 3.

Reference numeral 6 denotes a casing in which reduction mechanism of the motor 1 is contained The casing 6 is formed by molding a resin material and is provided integrally with a case body 7 and a gear case 9. The case body 7 is formed with a cylindrical part to rotatably support the other end part of the motor shaft 4 projecting from the motor yoke 3. Approximately half of the motor shaft 4 is contained in the cylindrical part of the case body 7. The gear case body 9 is arranged at one side of the case body (corresponding to the casing of the invention) 7 and is where the reduction mechanism members, such as a worm wheel 8 that meshes with a worm 4b formed on the motor shaft 4, large and small gears (not shown in the figure), and an output shaft (actuator driving output shaft, not shown in the figure) are contained, and the case body 7 and the gear case body 9 are formed to be the casing 6 in a state of being connected at the meshing part of the worm 4b and worm wheel 8.

The case body 7 receives an end part of the motor shaft 4 away from the motor yoke 3 that is rotatably supported by a bearing unit including a thrust bearing 4c, a damper 4d, and a radial metal bearing 4e at the tube bottom part 7a. The approximate central part of the motor shaft 4 is rotatably supported by a radial metal bearing 4h which is pressed into the opening part 7b side of the case body 7. Consequently, the motor shaft 4 is set so that three positions along its axis are supported by the motor yoke 3 or the case body 7. The end side of the case body 7 into which the motor shaft 4 is inserted is a motor shaft incorporation opening part (hereafter, referred to as the opening part) 7b. In the inside tube surface on the opening part 7b side, a holder receiving part 10 of the invention is buried on the cylindrical bottom side (toward the left side in FIGS. 1 and 8) of the case body 7 to divide that and the cylinder hole at the penetrating part of the motor shaft 4.

Figure 2:
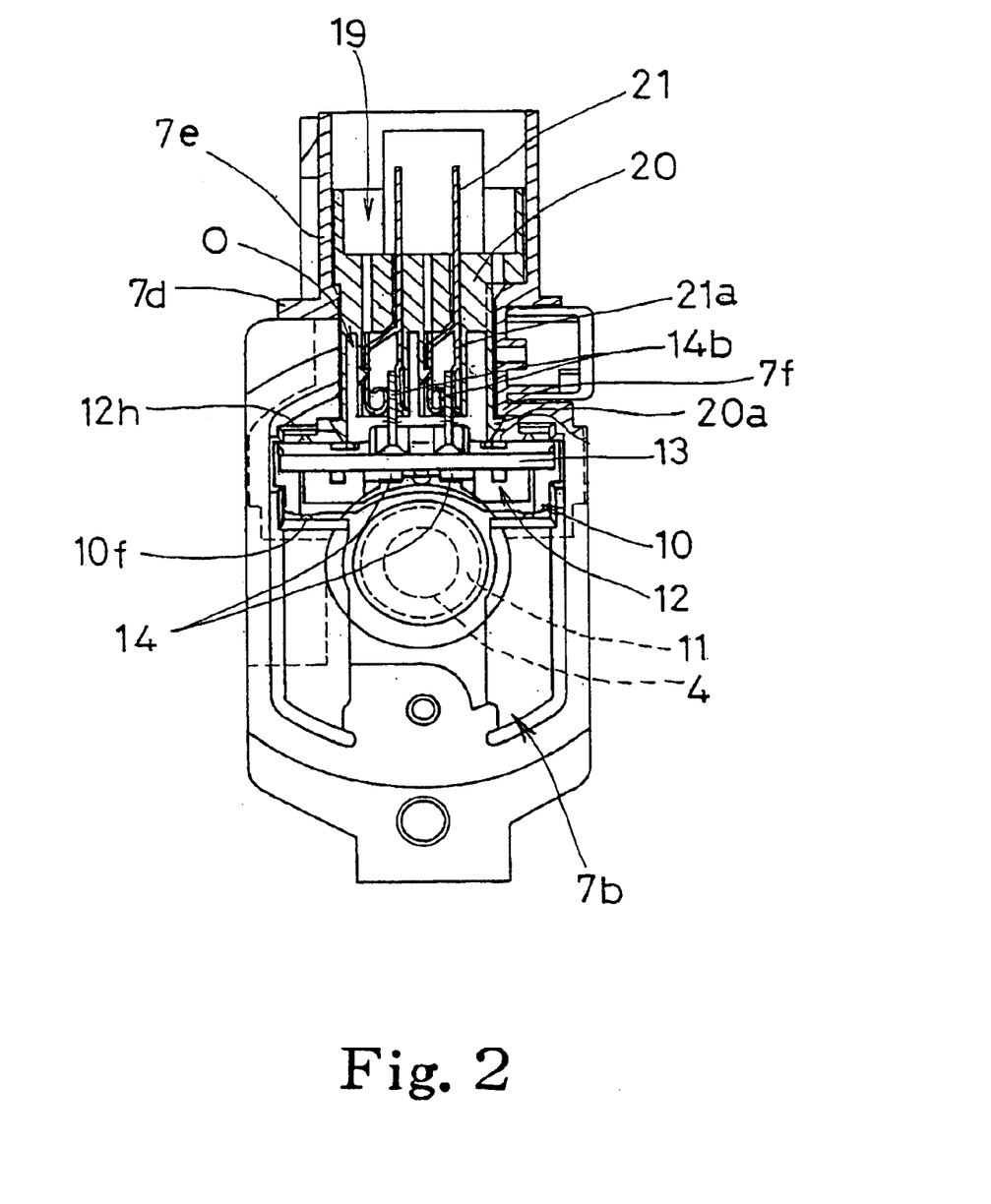
FIG 2 is a partial cross sectional side view of the state where the motor part of the motor is removed.
Figure 4:
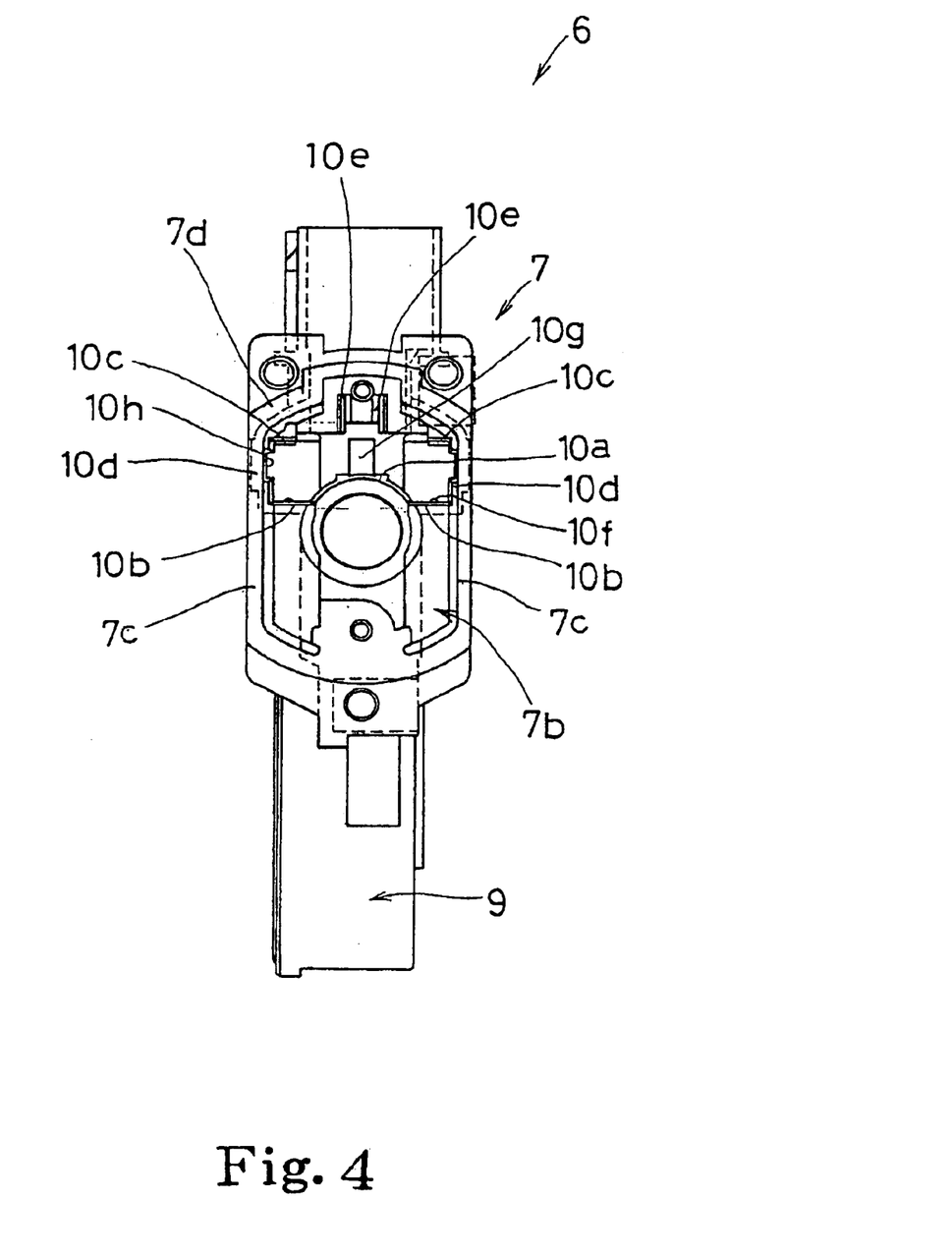
FIG. 4 is a side view of the casing.
Figure 5:
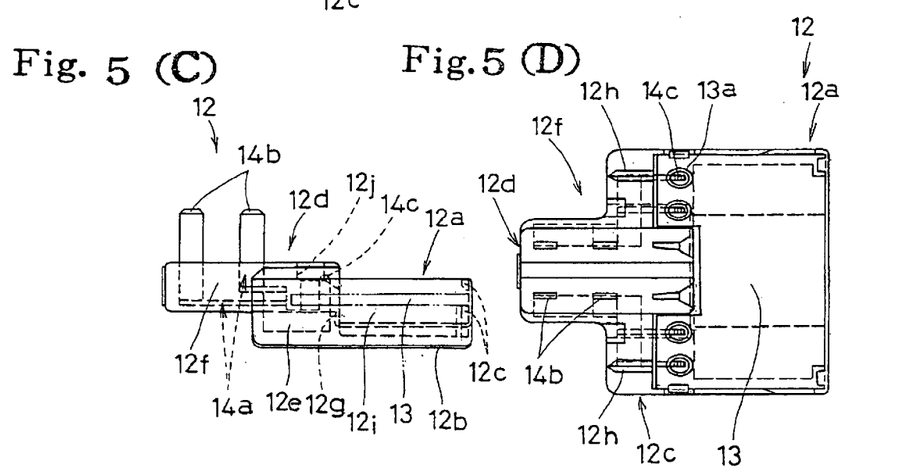
FIGS. 5(A), 5(B), 5(C), and 5(D) are a plan view, a front view, and a side view of a sensor holder, and a plan view of the state where a base plate is attached, respectively.
Figure 6:
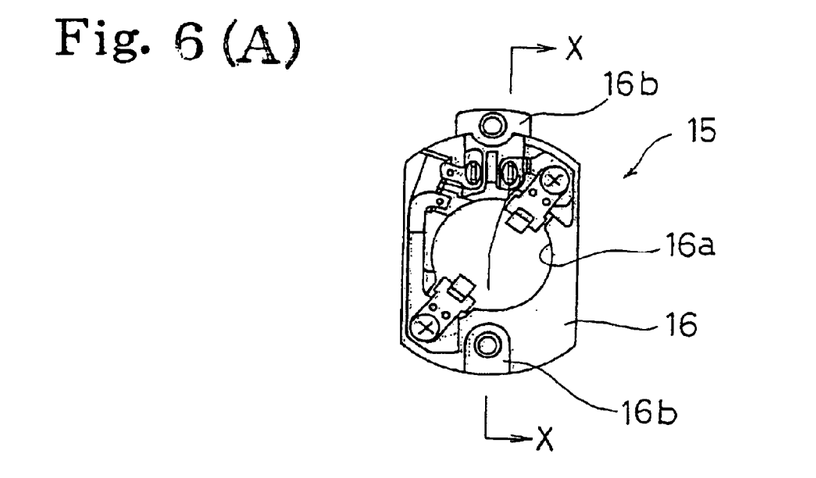
FIGS. 6(A), 6(B), and 6(C) are a side view and a plan view of a brush unit, and the 6—6 cross sectional view of FIG. 6(A), respectively.
Figure 7:
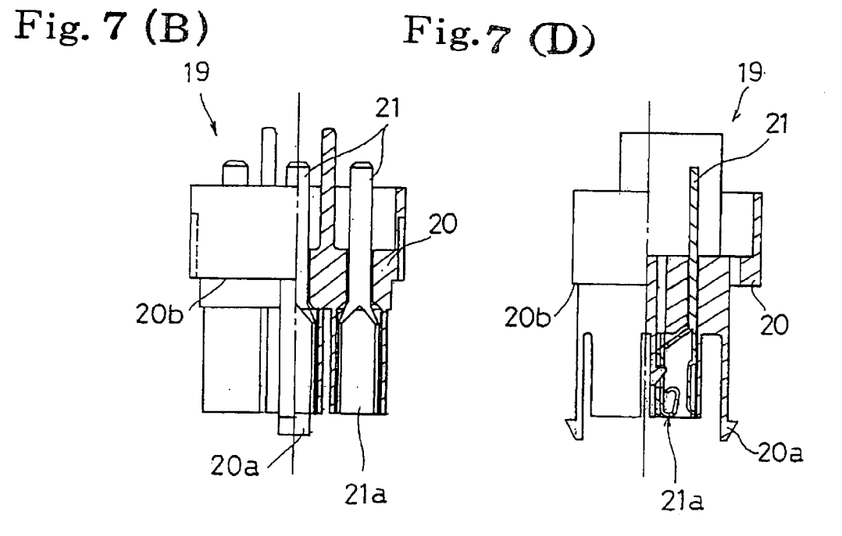
FIGS. 7(A), 7(B), 7(C), and 7(D) are a plan view, a partial cross sectional front view, a bottom view, and a partial cross sectional side view of a terminal unit, respectively.

The following description will be given on the basis of the vertical and horizontal directional properties as shown in FIGS. 2 and 4 in order to make the description understandable, but of course, the invention is not limited to these directional properties as the motor 1 may be oriented at any angle.

The holder receiving part 10 is formed to be a long space on the cylindrical bottom side of the case body 7, surrounded by a circular-arc-like piece part 10a (corresponding to the support piece part of the invention) which is positioned over the penetrating part of the motor shaft 4 of the case body 7 and where the under surface is formed like a circular arc to adjacently face to the motor shaft 4, the motor shaft passing therebetween; a pair of lower piece parts 10b located on the left and right sides 7c (as shown in FIG. 4) of the case body 7 extend from both left and right end edge parts of the circular-arc-like piece part 10a; a pair of upper piece parts 10c is formed at the upper side with a specified clearance from the lower piece parts 10b; and left and right piece parts 10d between the upper and lower piece parts 10c, 10b are formed on left and right sides 7c of the case body 7. Between the upper piece parts 10c of the holder receiving part 10, a pair of through holes 10e are formed, which are shaped like Π, i.e., shaped as grooves. Moreover, the circular-arc-like piece part 10a is cut off at the portion of the holder receiving part 10 which is positioned on the opening side of the cylindrical part of the case body 7, and on this side of the case body opening part 7b, a communicating part H (FIG. 8) where the holder receiving part 10 and the cylinder hole are communicated with each other is formed. Here, the circular-arc-like piece part 10a of the invention is formed to follow the upper part of the bearing part where the radial metal bearing 4h for supporting the motor shaft 4 is inserted. Then, the communicating part H is set to face to the fixing part of a sensor magnet 11 of the motor shaft 4 which is incorporated in the case body 7. The sensor magnet 11 is a ring-like magnet where the N-pole and S-pole are polarized by turns in the rotational direction, and is set to rotate integrally with the motor shaft 4.

On the upper surface of each lower piece part 10b of the holder receiving part 10, a rib 10f is formed, which projects toward the upside (inside of the holder receiving part 10). Moreover, on the cylindrical bottom side of the case body 7, a butting surface part 10g is formed, on the holder receiving part 10, that projects upward from the upper surface of the circular-arc-like piece part 10a.

Figure 3:
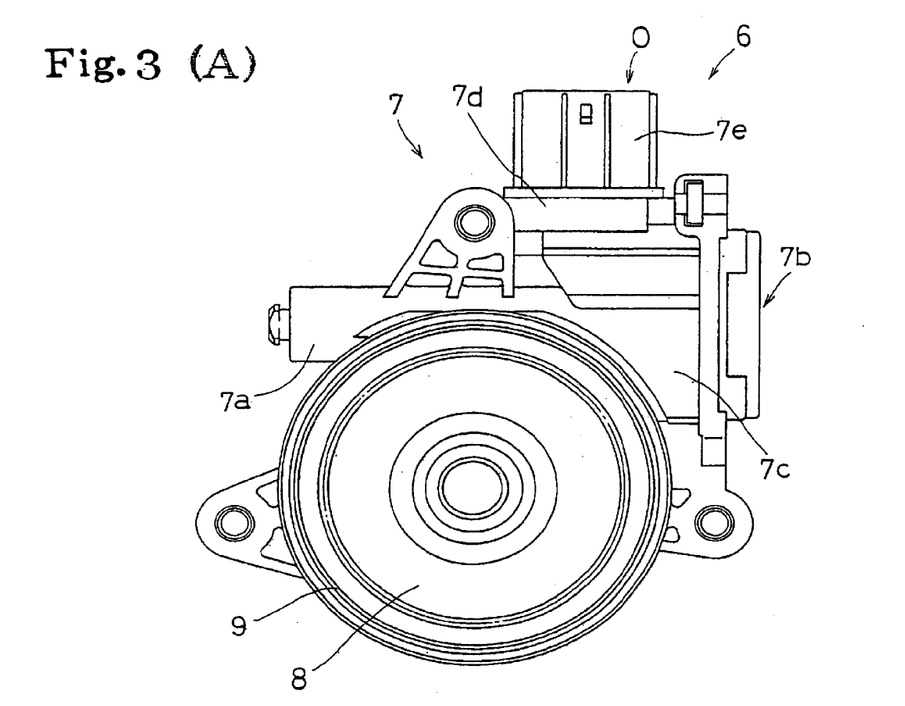
FIGS. 3(A) and 3(B) are a front view and a plan view of a casing, respectively.

Furthermore, at the upper surface part 7d (the other side of the case body 7, corresponding to the side on the opposite side of the gear case body 9) in the peripheral surface of the cylindrical part of the case body 7, a connecting opening part O (FIGS. 2 and 3) to be the connecting part to the external power source is formed, which is described later. The connecting opening part O is open at the upside of the holder receiving part 10 and on the cylindrical bottom side of the case body 7, that is, the position where the circular-arc-like piece part 10a can be seen, and is formed by cutting off the upper piece part 10c of the holder receiving part 10. Consequently, the outside of the case body 7 and the holder receiving part 10 in the case body communicate with each other via the connecting opening part O. Moreover, the connecting opening part O is open approximately like a quadrangle, and a rectangular-tube-like projecting piece part (corresponding to the male coupler outer frame, which is described later) 7e is integrally formed from the opening edge part extending upwardly (FIG. 2).

Figure 8:
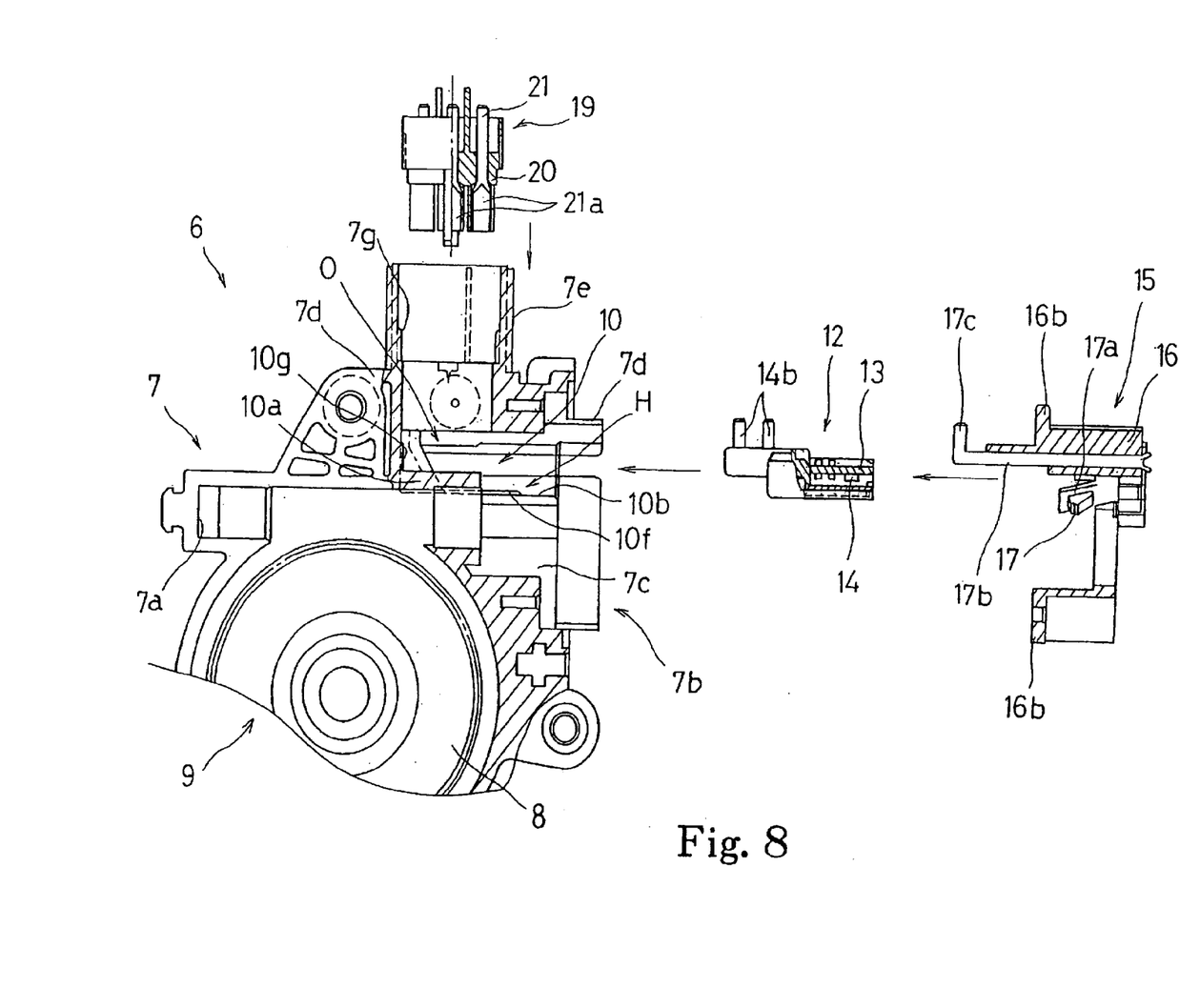
FIG. 8 is a front cross sectional view showing the state where a sensor holder, a brush unit, and a terminal unit are incorporated in the casing.
Figure 9A:
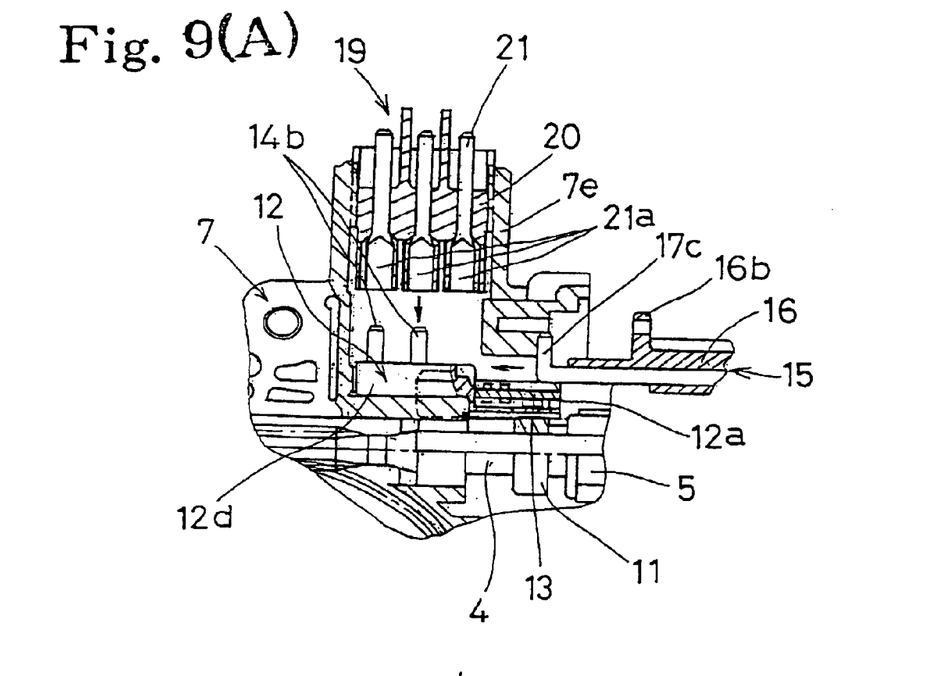
FIGS. 9(A) and 9(B) is a partially enlarged front cross sectional views explaining the incorporation of a sensor holder, a brush unit, and a terminal unit.
Figure 9B:
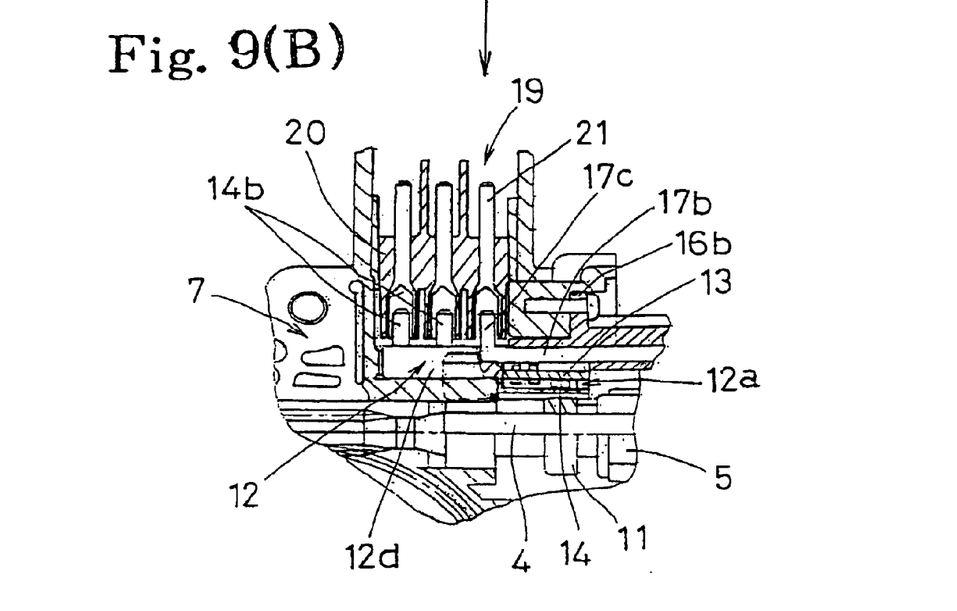

Reference numeral 12 (FIGS. 5(A)-5(D)) denotes a sensor holder which is integrally molded from a resin material to be fitted to the holder receiving part 10. In the sensor holder 12, one half part which is positioned on the opening side of the cylindrical part in the state of being incorporated in the holder receiving part 10 composes the concave-channel-like sensor support part 12a. The sensor support part 12a is shaped so that both left and right side parts are fitted to the space which is surrounded by the upper and lower piece parts 10c, 10b and left and right piece parts 10d of the holder receiving part 10, and at the horizontally central part of the bottom surface (under surface) composing a concave channel, a circular-arc-like concave part 12b is concavely provided to go around the sensor magnet 11 of the motor shaft 4. Moreover, formed to the sensor support part 12a are fixing claws 12c, which hold the base plate 13 between them from the positions above and below the base plate 13 to define a holding groove, so that the base plate 13 is supported in the state of having a specified clearance between that and the circular-arc-like concave part 12b. Then, at the under surface of the base plate 13, that is, at the surface facing to the circular-arc-like concave part 12b side of the base plate 13, are one pair of hall devices 14 (FIG. 8). The hall devices 14 correspond to the rotation detecting device of the invention and detect the rotation of the sensor magnet 11 are provided so as to stand horizontally in a line.

On the other hand, the other half part positioned on the cylindrical bottom side with respect to the sensor holder 12 composes the terminal support part 12d where two pairs of sensor terminals 14a for feeding electricity to the hall devices 14 are insert-molded. The terminal support part 12d includes a wider part 12e which has a horizontal width similar to that of the sensor support part 12a and a narrower part 12f which is formed on the cylindrical bottom side and has a width narrower than that of the wider part 12e. The under surface of the narrower part 12f and the under surface of the horizontally central part of the wider part 12e are formed between them and the sensor support part 12a via a step part 12g that is positioned higher than the surface of the circular-arc-like concave part 12b of the sensor support part 12a. Moreover, the upper surfaces of the narrower part 12f and the horizontally central part of the wider part 12e are positioned higher than the upper surface of the sensor support part 12a and, from the upper surface of the narrower part 12f, the external connecting side end parts 14b, that are one end parts of the one pair of (four in all) the sensor terminals (hall device terminals) 14a, are provided projecting upward and forming a double line at specified intervals. Furthermore, to the higher-positioned upper surface of the wider part 12e, a pair of terminal receiving parts 12j are formed as notches positioned horizontally aligned with the positions of the sensor terminals 14a, and the bent part 17c (FIGS. 6(B) and 6(C)) of the brush terminal 17b, which is described later, is received the terminal receiving part 12j in the butting state. Furthermore, to the upper surfaces of both the left and right end parts of the wider part 12e, are ribs 12h which project upwardly.

The end part of base plate 13 (FIG. 5(D)), which is disposed in the sensor support part 12a on the cylindrical bottom side is extended on the terminal support part 12d side at both the left and right end parts, where connecting holes 13a are formed, and the other end part 14c of each sensor terminal 14a is inserted into a corresponding connecting hole 13a and soldered to the connecting hole 13a, so that each sensor terminal 14a and hall device 14 are connected.

Furthermore, both the left and right side parts of the sensor holder wider part 12e are formed to have shapes following both the left and right side parts of the sensor support part 12a, arid at the side part thereof, a guide convex part 12i is formed. On the other hand, at the left and right piece parts 10d of the holder receiving part 10, a guide concave part 10h (FIG. 4) which is concavely formed, respectively, and the guide convex part 12i is engaged with the guide concave part 10h to perform the positioning and the movement guidance of the sensor holder 12. That is, the sensor holder 12 is set to be incorporated in the following steps: the external connecting side end part 14b of the upward projecting sensor terminal 14a is inserted into the through hole 10e, and the guide convex part 12i of the terminal support part wider part 12e engages with the guide concave part 10h of the case body opening part 7b to perform positioning. In this state, by pushing in the shaft length direction of the motor shaft 4, similarly to the incorporation of the motor shaft 4, the sensor holder 12 is guided by the guide concave part 10h (keeping the attitude) and slides into the holder receiving part 10 on the cylindrical bottom side. Then, it is set that the sensor holder 12 is incorporated in a specified incorporation position of the holder receiving part 10, by taking the state where the step part 12g between the terminal support part 12d and the sensor support part 12a is butted against the opening side end surface of the circular-arc-like piece part 10a. In this incorporation process, both the left and right end parts of the wider part 12e of the terminal support part 12d are arranged to be lightly pressed into the holder receiving part 10, by means of the rib 10f projecting at the lower piece part 10b of the holder receiving part 10 and the rib 12h projecting at the upper surface of the wider part 12e of the sensor holder 12. Consequently, the sensor holder 12 is incorporated in the incorporation position in the state of temporary holding.

Then, by being positioned at the incorporating position, the terminal support part 12d of the sensor holder 12 is positioned at the upper side of the circular-arc-like piece part 10a of the holder receiving part. In this position, the upper side in the incorporating direction can come into contact with a terminal unit 19, and the terminal support part 12*d* is set to be positioned right under the connecting opening part O which is open in the case body 7. On the other hand, the sensor support part 12*a* is set to face to the communicating part H which is formed by cutting off the circular-arc-like piece part 10*a* of the holder receiving part. Consequently, the hall devices 14 of the sensor support part 12*a* are adjacently faced to the sensor magnet 11 of the motor shaft 4 in the state of having the circular-arc-like concave part 12*b* of the sensor holder between them and the sensor magnet 11 of the motor shaft 4. Positioned such, the hall device 14 can detect the rotational state of the sensor magnet 11.

Furthermore, reference numeral 15 (FIGS. 6(A)-6(C)) denotes a brush unit which is incorporated in the case body 7 after incorporating the sensor holder 12. The brush unit 15 has a pair of base end parts each having of a plate spring 17*a* where a brush 17 is arranged at the tip. The brush end parts are fixed on one side of a disk-like brush stay 16 having a through hole 16*a* for the penetration of the motor shaft 4. The brush unit 15 is fixed by screwing the attaching parts 16*b*, formed on the outside diameter part of the brush stay 16, to the end surface of the opening part 7*b* of the case body 7 to be set in a fixed state. The brushes 17 then come into sliding contact with the commutator 5 of the motor shaft 4 in an elastically pressing state.

A pair of brush terminals 17*b*, which feed electricity to the brushes 17 with one formed integrally with each plate spring 17*a*, are provided on the brush stay 16. The brush terminals 17*b* extend toward the cylindrical bottom side of the case body 7 when the brush unit 15 is incorporated into the case body 7, and each bent part 17*c*, the external connecting end part, is set to come into contact with one of the pair of notch-like terminal receiving parts 12*j* of the sensor holder 12 positioned at the previously set incorporating position in the butting state. Thus, when mounted, the brush stay attaching parts 16*b* are butted against the end surface of the case body opening part 7*b*, and the normal incorporation can be performed. Therefore, in the case where the step part 12*g* of the sensor holder 12 is incorporated in the state of not butting against the opening side end surface of the holder receiving part circular-arc-like piece part 10*a*(in the state where the sensor holder 12 is not positioned at the specified incorporation position, and is positioned on the holder receiving part 10 at the cylindrical bottom side), it is set that the brush stay attaching part 16*b* and the end surface of the case body opening part 7*b* cannot come into contact with each other, even if the brush terminal bent part 17*c* comes into contact with the sensor holder notch part 12*g*. Consequently, the incorporation state of the sensor holder 12 can be confirmed by the incorporation state of the brush unit 15. And at this moment by further pushing in the brush unit 15 to make the brush stay attaching part 16*b* come into contact with the end surface of the case body opening part 7*b*, the positioning of the sensor holder 12 can be performed through the brush terminal bent part 17*c*.

Figure 1:
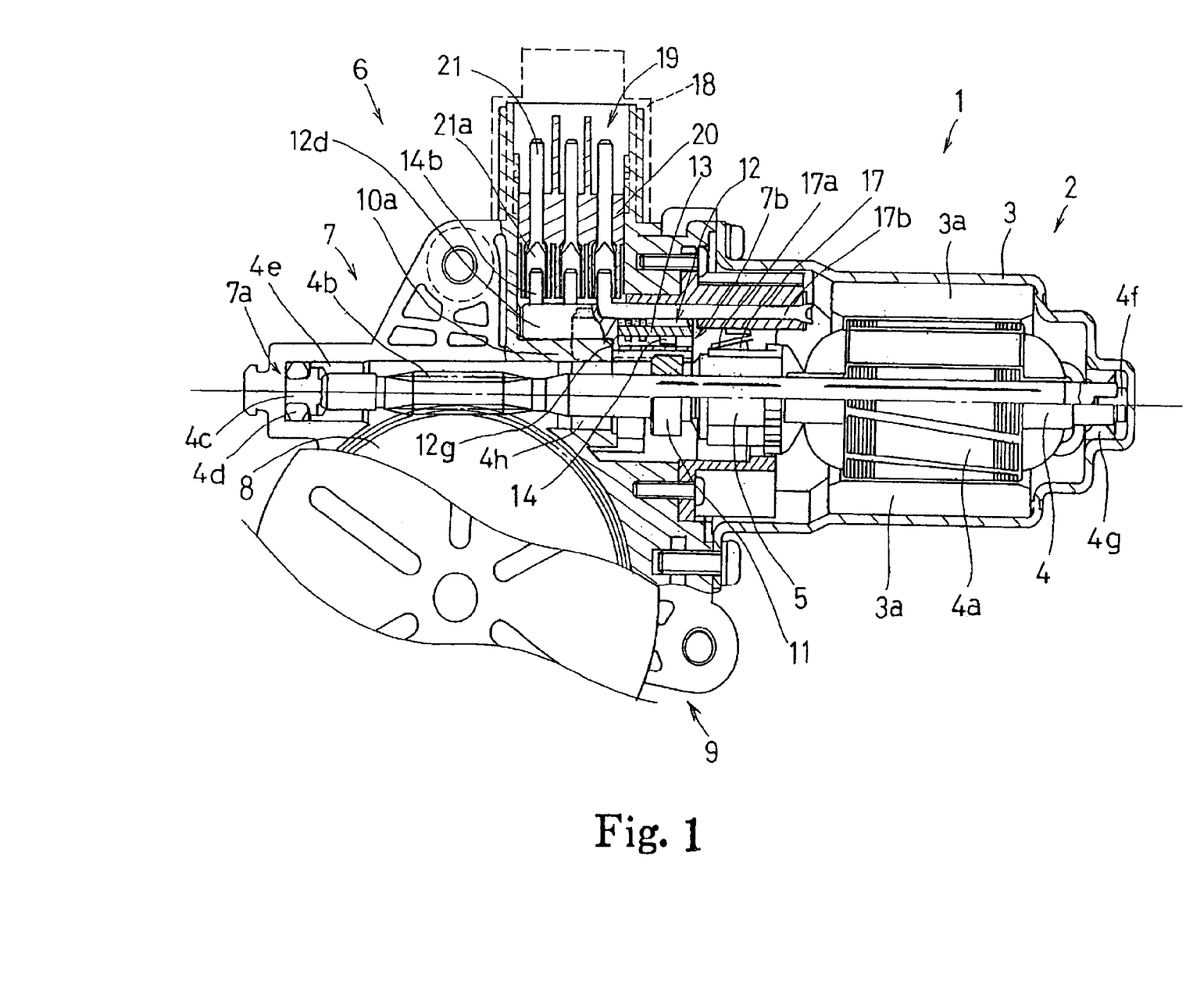
FIG. 1 is a partial cross sectional front view of a motor.

In the state where the sensor holder 12 and the brush unit 15 are incorporated in the case body 7, from the connecting opening part O of the case body 7, the sensor terminal external connecting part 14*b*, which projects from the sensor holder terminal support part 12*d*, and the brush terminal bent part 17*c* can be seen. On the other hand, a terminal unit (male coupler terminal part) 19 (FIGS. 7(A)-7(D)) connects the sensor terminal external connecting part 14*b* and brush terminal bent part 17*c* to the coupler (female coupler) 18 (FIG. 1) on the external power source side and is attached to the connecting opening part O. The terminal unit 19 is set to compose the male coupler by being inserted from the upside (from the outside), as shown in FIG. 1, into the rectangular-tube-like projecting piece part 7*e* forming in the connecting opening part O. The terminal unit 19 comprises a terminal holder 20, which is formed approximately like a rectangular pillar shape to be inserted into the projecting piece part (male coupler outer frame) 7*e* in the slip-off-stopping state and six middle terminals 21 are incorporated in a double line to be positioned at the part facing to the sensor terminal external connecting parts 14*b* and the brush terminal bent parts 17*c* that can be seen from the connecting opening part O. Furthermore, engaging claws 20*a* are formed on one pair of left and right incorporating tip sides which face to each other of the terminal holder 20 and are set to be engaged with the step-like engagement receiving part 7*f* formed in the connecting opening part O when the terminal unit 19 is incorporated in the connecting opening part O, so that the terminal unit 19 is surely fixed to the connecting opening part O. By the way, the engagement receiving part 7*f* is arranged to be integrally formed by being drawn from the incorporating direction of the brush unit 15 when molding the cylindrical part of the case body 7.

By inserting the terminal unit 19 into the connecting opening part O, the lower end part 21*a* of each middle terminal 21 and an associated one of the sensor terminal external connecting parts 14*b* and the brush terminal bent parts 17*c* are electrically connected. Consequently, the terminal unit 19 can be incorporated in the connecting part where the sensor terminal 14*a* and the brush terminal 17*b* are joined. By connecting the female coupler 18 on the vehicle body side to the male coupler, which includes the terminal unit 19 and the projecting piece part 7*e*, the electrical connection can simultaneously be performed to both the hall device 14 and the brush 17. Furthermore, it is arranged that when the terminal unit 19 is incorporated up to the specified position, the concave step 20*b* formed on the peripheral surface of the terminal holder 20 comes into contact with the convex step 7*g* formed to the inner peripheral surface of the projecting piece part 7*e* to regulate any further incorporation to the back side.

Here, the terminal unit 19 composes the male coupler in cooperation with the projecting piece part 7*e*. At the time of connection with the conventional type vehicle body side female coupler 18, which is arranged on the vehicle body side, the seal is accomplished at the same time as the connection of the fellow couplers by the water proof means which is separately arranged, and the intrusion of water into the connecting opening part O at the lower part of the terminal holder 20 is prevented. Thus, a special water proof structure for the sensor holder terminal support part 12*d* is unnecessary. Furthermore, it is set that the sensor terminals 14*a*, which are disposed in the sensor holder 12 are insert-molded and have no looseness, but the brush terminals 17*b* which are disposed in the brush unit 15 are incorporated such that a little looseness is allowable, and functions as play when inserting and connecting the external power source coupler 18 to the terminal unit 19.

Furthermore, by incorporating the motor yoke 3, which pivots one end part of the motor shaft 4, to the casing 6 in which the sensor holder 12, brush unit 15, and terminal unit 19 are mounted, the incorporation of the motor 1 is completed. It should be noted that the motor yoke 3 is fixed by making the opening end part thereof butt against the attaching part outside diameter side of the brush unit 15 at the end surface of the case body opening part 7*b* and by screwing thereto.

In the case of the preferred embodiment of the invention structured as mentioned above, the rotation detection of the motor shaft 4 is performed by detecting the rotation of the sensor magnet 11 which rotates integrally with the motor shaft 4 by the hall device 14. Consequently, it is possible to detect the movement amount or the position of the movable member which acts on the basis the output shaft practicing the output through the reduction mechanism. Then, in this case, the hall device 14 is incorporated in the sensor holder 12, and the sensor holder 12 is arranged in the inside of the case body 7, by being incorporated toward the tube bottom side (channel back side) from the opening part 7b, which is the incorporation direction of the motor shaft 4 to the holder receiving part 10 formed to the case body 7, and it is unnecessary to plan a special-water proof structure. Furthermore, in this case, the sensor holder 12 is incorporated in the state of being lightly pressed into the holder receiving part 10, and therefore, that can temporarily be held in the case body 7 by performing the incorporation work, and it is unnecessary to separately use fixing means. As a result, the attachment work can be simplified.

On the other hand, in the case of the incorporation to the connecting opening part O of the terminal unit 19, it is surely fixed by engaging the engaging claw 20, which is formed on the incorporating tip side of the terminal holder 20 with the step-like engagement receiving part 7f which is formed in the connecting opening part O, and the water proof structure can be provided only by engaging and attaching the engaging claw 20 to the engagement receiving part 7f. In the meantime, the incorporation workability can also be improved, which is different from the case in which an engaging hole is pierced on the case side and an engaging claw on the terminal unit side is engaged with the engaging hole as shown in the prior art.

Furthermore, the engagement receiving part 7f is set to be integrally formed by being drawn from the incorporating direction of the brush unit 15 when the cylindrical part of the case body 7 is molded. Thus, the number of parts can be reduced.

Furthermore in this embodiment, the terminal support part 12d, which is formed to the sensor holder 12, faces the connecting opening part O, which is formed in the tube peripheral surface of the case body 7, and the structure is made such that the brush terminal bent part 17c of the brush unit 15 is also provided to the terminal support part 12d in addition to the sensor terminal external connecting part 14b. Therefore, it is possible to integrate the sensor terminal external connecting part 14b and the brush terminal bent part 17c by inserting the terminal unit 19 into the connecting opening part O. Further, by connecting the coupler 18 on the external power source side to the terminal unit 19, the electrical connection can simultaneously be performed to both the hall devices 14 and the brushes 17. As a result, it becomes unnecessary to make a structure where the lead wires, each of which is separately pulled out, are collected into the extension harness like the conventional one using lead wires, and the number of parts can be reduced. In terms of the cost, a low price can also be achieved and, in addition, the automatic incorporation also makes it possible to achieve the improvement in the workability.

Furthermore, in this embodiment, even if the sensor holder 12 is incorporated in the state where it does not reach the channel depth previously set to the holder receiving part 10 and has a positional deviation, the brush terminal bent part 17c of the brush unit 15 acts to press the sensor holder 12 to the specified position by incorporating the brush unit 15, and the sensor holder 12 is properly positioned. As a result, the bad incorporation is eliminated and the dispersion in product quality is reduced.

Furthermore, in this case, the circular-arc-like piece part 10a is formed on the holder receiving part 10 on the cylindrical bottom side and, when the sensor holder 12 is incorporated in the holder receiving part 10, the terminal support part 12d is positioned on the upside of the circular-arc-like piece part 10a, that is, the upper side in the incorporating direction of the terminal unit 19. In this state, the terminal unit 19 is incorporated in the terminal support part 12d and, therefore, the load in the incorporating direction, which is produced at the time of incorporation, is received by the circular-arc-like piece part 10a which comes into contact with the terminal support part 12d, and it does not directly act on the terminal support part 12d. As a result, it avoids the incorporating load acting on not only the sensor holder 12 but also the base plate 13, and the accuracy of the rotation detection can be raised.

Furthermore, in this case, even if the motor 1 is formed to have a horizontally mirror image structure of the motor 1, the shape of the engagement receiving part 10 needs not be made a horizontally mirror image. Therefore, common parts can be used and, therefore, it becomes possible to deal with the sensor holder 12 only by forming one kind. The common member can be used to achieve an improvement in quality control and to achieve a low cost.

Furthermore, in the case of the embodiment, it is also possible to construct a motor with a specification which requires no position detecting mechanism of the motor, only by incorporating a brush unit 15 in the casing 6 without incorporating a sensor holder 12 therein, and it becomes possible to use the common member.

Thus, in the case of the invention, by doing this, in a motor with a rotation detecting device, the sensor holder composing the rotation detecting device is contained in the case body by being incorporated from the incorporating direction of the rotary shaft, and on the other hand, the connection between the external pull-out terminal unit and the connecting opening part is performed by engaging the engaging claw formed on the terminal holder, with the step-like engagement receiving part formed on the connecting opening part. Therefore, a simple structure is realized, and the number of parts is reduced in addition to a water proof structure being provided.

Furthermore, because the incorporating load which is produced when incorporating the external pull-out terminal unit into the sensor holder is received by the circular-arc-like piece part of the holder receiving part, it is avoided that the incorporating load acts directly on the sensor holder to deform the sensor holder, which enables providing a rotation detecting device with a high accuracy.

What is claimed is:

1. A motor with a rotation detecting device, comprising:
   a rotary shaft;
   a yoke in a bottomed cylindrical shape which rotatably supports one end of the rotary shaft and attaches permanent magnets on its inner peripheral surface;
   a casing with a bottomed cylindrical part which is connected to the open end of the yoke and rotatably contains the other end of said rotary shaft; and
   a rotation detecting device which detects rotation of said rotary shaft, wherein the rotation detecting device is supported by a sensor holder, the sensor holder is provided with an outer electrical connecting portion and is disposed in the casing by insertion into a sensor holder receiving part formed in the casing from the same direction as an incorporating direction of the rotary shaft into the bottomed cylindrical part, and the casing is provided with an electrical connecting opening part from and right under which the outer electric connecting portion of the sensor holder which has been inserted into the sensor holder receiving part is seen and which is positioned orthogonal to the insertion direction of the sensor holder, whereby an electrical connection for the sensor holder is made from the electrical connecting opening part.

2. The motor with a rotation detecting device according to claim 1, further comprising the sensor holder receiving part formed on the inner peripheral surface of the bottomed cylindrical part of the casing, and the sensor holder is removably seated in said sensor holder receiving part.

3. The motor with a rotation detecting device according to claim 2, further comprising:
a sensor support part in which the rotation detecting device is incorporated and a terminal support part in which a connecting terminal thereof is incorporated formed in the sensor holder, wherein the electrical connecting opening part, enabling seeing the terminal support part from the outside, is formed on the peripheral surface of the bottomed cylindrical part of the casing.

4. The motor with a rotation detecting device according to claim 2, further comprising a brush unit in which a brush is incorporated is fixed on the opening side of the bottomed cylindrical part of the casing and the sensor holder in the casing is positioned and supported by the casing on the basis of fixing the brush unit to the casing.

5. The motor with a rotation detecting device according to claim 1, wherein the sensor holder comprises a sensor support part in which the rotation detecting device is incorporated and a terminal support part in which a connecting terminal thereof is incorporated, respectively formed in the sensor holder, wherein the electrical connecting opening part, enabling seeing the terminal support part and the outer electric connecting portion from outside of the casing, is formed on the outer peripheral surface of the bottomed cylindrical part of the casing.

6. The motor with a rotation detecting device according to claim 5, further comprising a brush connecting terminal incorporated in a brush unit to extend onto and be supported by the terminal support part of the sensor holder, and which can be seen from the electrical connecting opening part of the casing.

7. The motor with a rotation detecting device according to claim 6, further comprising at least one projecting piece part which projects toward the outside diameter side formed in the electrical connecting opening part of the casing.

8. The motor with a rotation detecting device according to claim 6, wherein the terminal of the terminal support part is supported in the state of projecting in the outside diameter direction of the bottomed cylindrical part, and a support piece part which supports the terminal support part of the sensor holder is formed on a top surface of the bottomed cylindrical part, and an incorporation load at the time of incorporating the external pull-out terminal unit to the terminal support part is received by the support piece part.

9. The motor with a rotation detecting device according to claim 5, further comprising at least one projecting piece part which projects from the outside diameter side formed in the electrical connecting opening part of the casing.

10. The motor with a rotation detecting device according to claim 9, further comprising an external pull-out terminal unit which is electrically connected to each connecting terminal of the rotation detecting device and the brushes and is mounted into the electrical connecting opening part.

11. The motor with a rotation detecting device according to claim 10, wherein the sensor holder comprising the terminal support part that supports a terminal projecting into the electrical connecting opening part and the terminal support part is received on a support piece part which is formed on a top surface side of the bottomed cylindrical part, and an incorporation load at the time of incorporating the external pull-out terminal unit to the terminal support part is received by the support piece part.

12. The motor with a rotation detecting device according to claim 11, further comprising at least one engaging claw formed on the incorporating tip side in the external pull-out terminal unit, and said engaging claw is engaged with a step-like engagement receiving part which is formed to the connecting opening part when the external pull-out terminal unit is incorporated in the electrical connecting opening part.

13. The motor with a rotation detecting device according to claim 10, further comprising at least one engaging claw formed on an insertion side of the external pull-out terminal unit, and the engaging claw is engaged with a step-like engagement receiving part, which is formed on an interior surface of the electrical connecting opening part, when the external pull-out terminal unit is inserted into the connecting opening part.

14. The motor with a rotation detecting device according to claim 13, wherein the engagement receiving part is formed integrally when the casing is molded.

15. The motor with a rotation detecting device according to claim 10, further comprising at least one engaging claw formed on the incorporating tip side in the external pull-out terminal unit, and said engaging claw is engaged with a step-like engagement receiving part which is formed to the connecting opening part when the external pull-out terminal unit is incorporated in the electrical connecting opening part.

16. The motor with a rotation detecting device according to claim 9, wherein the terminal of the terminal support part is supported in the state of projecting in the outside diameter direction of the bottomed cylindrical part, and a support piece part on the channel back side which supports the terminal support part of the sensor holder is formed on a top surface of the bottomed cylindrical part, and an incorporation load at the time of incorporating the external pull-out terminal unit to the terminal support part is received by the support piece part.

17. The motor with a rotation detecting device according to claim 5, further comprising a brush unit in which a brush is incorporated is fixed on the opening side of the bottomed cylindrical part of the casing and the sensor holder in the casing is positioned and supported by the casing on the basis of fixing the brush unit to the casing.

18. The motor with a rotation detecting device according to claim 5, wherein the terminal of the terminal support part is supported in the state of projecting in the outside diameter direction of the bottomed cylindrical part, and a support piece part which supports the terminal support part of the sensor holder is formed on a top surface of the bottomed cylindrical part, and an incorporation load at the time of incorporating the external pull-out terminal unit to the terminal support part is received by the support piece part.

19. The motor with a rotation detecting device according to claim 1, further comprising a brush unit in which a brush is incorporated is fixed on the opening side of the bottomed cylindrical part of the casing and the sensor holder in the casing is positioned and supported by the casing on the basis of fixing the brush unit to the casing.

20. The motor with a rotation detecting device according to claim 19, further comprising a brush connecting terminal incorporated in the brush unit to extend onto and be supported by the terminal support part of the sensor holder, and can be seen from the electrical connecting opening part of the casing.

* * * * *